United States Patent
Shakal

(10) Patent No.: US 11,344,017 B2
(45) Date of Patent: May 31, 2022

(54) TIP-DOWN FISHING ROD HOLDER

(71) Applicant: Trent A. Shakal, Hixton, WI (US)

(72) Inventor: Trent A. Shakal, Hixton, WI (US)

( * ) Notice: Subject to any disclaimer, the term of this patent is extended or adjusted under 35 U.S.C. 154(b) by 203 days.

(21) Appl. No.: 16/704,631

(22) Filed: Dec. 5, 2019

(65) Prior Publication Data

US 2020/0205389 A1 Jul. 2, 2020

Related U.S. Application Data

(60) Provisional application No. 62/786,120, filed on Dec. 28, 2018.

(51) Int. Cl.
*A01K 97/10* (2006.01)
*A01K 97/12* (2006.01)

(52) U.S. Cl.
CPC .............. *A01K 97/10* (2013.01); *A01K 97/12* (2013.01)

(58) Field of Classification Search
CPC ................................. A01K 97/01; A01K 97/12
See application file for complete search history.

(56) References Cited

U.S. PATENT DOCUMENTS

| 5,107,614 A | * | 4/1992 | Gonnello | A01K 97/01 43/17 |
| D659,223 S | * | 5/2012 | Lefgren | D22/147 |
| 2013/0125445 A1 | * | 5/2013 | Schmitt | A01K 97/10 43/4.5 |
| 2013/0255130 A1 | * | 10/2013 | Baugh | A01K 97/01 43/4.5 |

FOREIGN PATENT DOCUMENTS

KR 100862373 B1 * 10/2008

* cited by examiner

*Primary Examiner* — Timothy D Collins
*Assistant Examiner* — Nicholas Leo Seneczko
(74) *Attorney, Agent, or Firm* — Ruder Ware, L.L.S.C.

(57) ABSTRACT

A tip-down fishing rod holder comprising three legs, two plates, two arms, and a rod holder strap with a pivot pin. The various components of the fishing rod holder are held together by fasteners, some of which are pivots that allow the three legs to rotate relative to the two arms. Thus, the rod holder is configured to shift between a roughly tri-pod configuration to securely hold a fishing rod while fishing and a folded configuration in which the holder has a substantially flat configuration to provide easy transport and storage.

16 Claims, 5 Drawing Sheets

TIP-DOWN FISHING ROD HOLDER

CROSS-REFERENCE TO RELATED APPLICATION

This application is based upon and claims the benefit of U.S. Provisional Application Ser. No. 62/786,120, filed Dec. 28, 2018.

BACKGROUND OF INVENTION

The invention disclosed herein generally relates to fishing rod holders and, more specifically, a tip-down fishing rod holder that allows a fisherman to place a fishing line in the water while the rod itself is unattended (for example, for ice fishing).

In the prior art, there are a variety of different fishing rod holders that hold fishing rods in different ways and for different purposes.

Some are static in nature and rigidly hold a fishing rod, most commonly fishing rod holders for use on boats, other watercraft and the like. These holders typically consist of a roughly cylindrical or slightly cone-shaped body, usually with a flexible interior, into which the handle of the fishing rod is inserted and then held in place via friction. The holder only holds the fishing rod in a static position, such that the holder does not react when a fish nibbles or bites on the end of the line. Typically, these holders are merely intended to temporarily hold the fishing rod as the fisherman stays nearby.

Another type of fishing rod holder is a tip-up fishing rod holder. With a tip-up fishing rod holder, there typically is a body similar to the rigid fishing rod holders with a roughly cylindrical or slightly cone-shaped body for holding the handle of the fishing rod mounted on some type of base which rests on the surface of the ice or ground. In some cases, in place of the base there are spikes or projections that can be driven into the ice or ground by the fisherman to provide a more secure connection to the ice or ground. These fishing rod holders also include a mechanism for holding the tip of the rod (or some location along the rod near the tip) so that the rod is held under tension. Then, when a fish nibbles the end of the line, the mechanism holding the tip releases, releasing the tension in the rod and jerking the tip upward and setting the hook in the mouth of the fish. Thus, the purpose of tip-up fishing rod holders is to allow the fisherman to leave the fishing rod somewhat unattended while still allowing the rod holder to react to set the hook in the mouth of a fish automatically, without direct intervention of the fisherman when the fish is nibbling or biting on the line.

The final general type of rod holder is a tip-down fishing rod holder. With a tip-down fishing rod holder, there typically is some type of base (or spikes or projections that can be driven into the ice or ground) with a post extending upward holding a roughly cylindrical or slightly cone-shaped body for holding the handle of the fishing rod mounted on a pivot. This allows the rod to tip gently downward, bringing the tip of the rod closer to the surface of the water, when a fish nibbles or bites on the end of the line. A tip-down fishing rod holder is typically used when it is undesirable to have the strong jerking reaction of a tip-up type fishing rod holder.

However, there is a need for a tip-down fishing rod holder that has both superior balance and resistance to being pulled into the water and the ability to quickly and easily fold up to take limited space to transport. The present invention satisfies such a need.

SUMMARY OF THE INVENTION

It is a feature of the present invention to provide a fishing rod holder and, more specifically, a tip-down fishing rod holder that provides a stable platform for holding a fishing rod while still being able to be folded up to allow for easy transport.

The fishing rod holder of the present invention comprises three legs, two plates, and two arms, as well as a rod holder strap for holding the fishing rod itself. The various components of the fishing rod holder are held together by fasteners, some of which are pivots that allow the three legs to rotate relative to the two arms. Thus, the rod holder is configured to shift between a roughly tri-pod configuration to securely hold a fishing rod while fishing (more specifically, ice fishing) and a folded configuration in which the holder has a substantially flat configuration to provide easy transport and storage.

The fishing rod holder of the present invention may be constructed of any suitable material for the legs, plates, strap, and fasteners. In one preferred embodiment of the rod holder of the present invention the legs and arms are constructed of wood, the plates are constructed of plastic, and the fasteners and pivots are constructed of metal.

One of the plates is secured to the two arms and two of the legs and the two legs rotate relative to both the plate and the two arms. The second plate is secured to the remaining leg and both the second plate and remaining leg rotate relative to the two arms.

The rod holder strap comprises a plurality of hook and loop straps and a pivot pin that extends through one of the straps. The hook and loop straps may be secured around a fishing rod, such that the pivot pin extends outward perpendicularly from the fishing rod.

The upper end surface of the two legs define a slot or channel for receiving the pivot pin of the rod holder strap, such that the pivot pin allows the fishing rod being held by the rod holder strap to rotate relative to the two arms and the fishing rod holder as a whole.

When the fishing rod holder is in its roughly tri-pod configuration, it provides a secure and stable base for the fishing rod held within the rod holder strap, while allowing the fishing rod to "tip down" when a fish nibbles or bites on the fishing line.

When the fishing rod holder is in its folded configuration, the fishing rod holder is flattened and the three arms, two legs, and two plates are all substantially parallel, resulting in a fishing rod holder that can be transported or stored easily and in a way that takes up as little space as possible.

Thus, the present invention provides a fishing rod holder of the "tip-down" type that provides a stable and secure holder for a fishing rod yet can also be folded up in such a way as to minimize the space necessary for both transporting and storing the fishing rod holder when it is not in use.

DETAILED DESCRIPTION OF THE PREFERRED EMBODIMENT(S)

Figure 1:
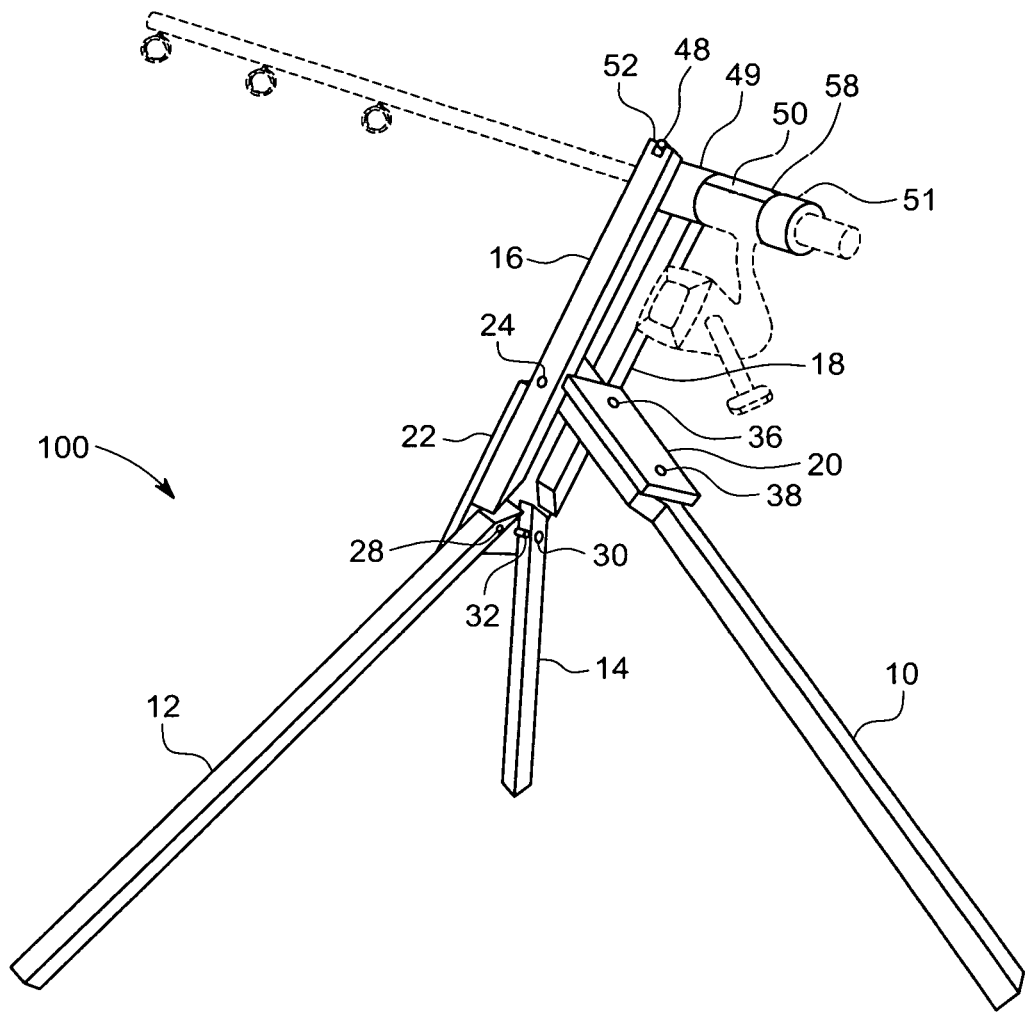
FIG. 1 shows a perspective view of an embodiment of the tip-down fishing rod holder of the present invention from the back side of the holder, with a fishing pole shown in the holder and with the holder shown in its opened configuration.

The tip-down fishing rod holder 100 of the present invention comprises three legs 10, 12, 14, two plates 20, 22, two arms 16, 18, and rod holder strap 56. The fishing rod holder 100 is configured to have a tri-pod configuration to securely hold a fishing rod while fishing (more specifically, ice fishing) when it is in its opened position, as may be seen in FIGS. 1-3, and a folded configuration in which the holder has a substantially flat configuration to provide easy transport and storage when it is in its closed position, as may be seen in FIG. 4. The fishing rod holder 100 may be constructed of any suitable material for the legs 10, 12, 14, plates 20, 22, and arms 16, 18, and the various pins and fasteners holding these components for the fishing rod holder 100 together. In one preferred embodiment of the rod holder of the present invention the legs and arms are constructed of wood, the plates are constructed of plastic, and the various pins and fasteners are constructed of metal.

Figure 2:
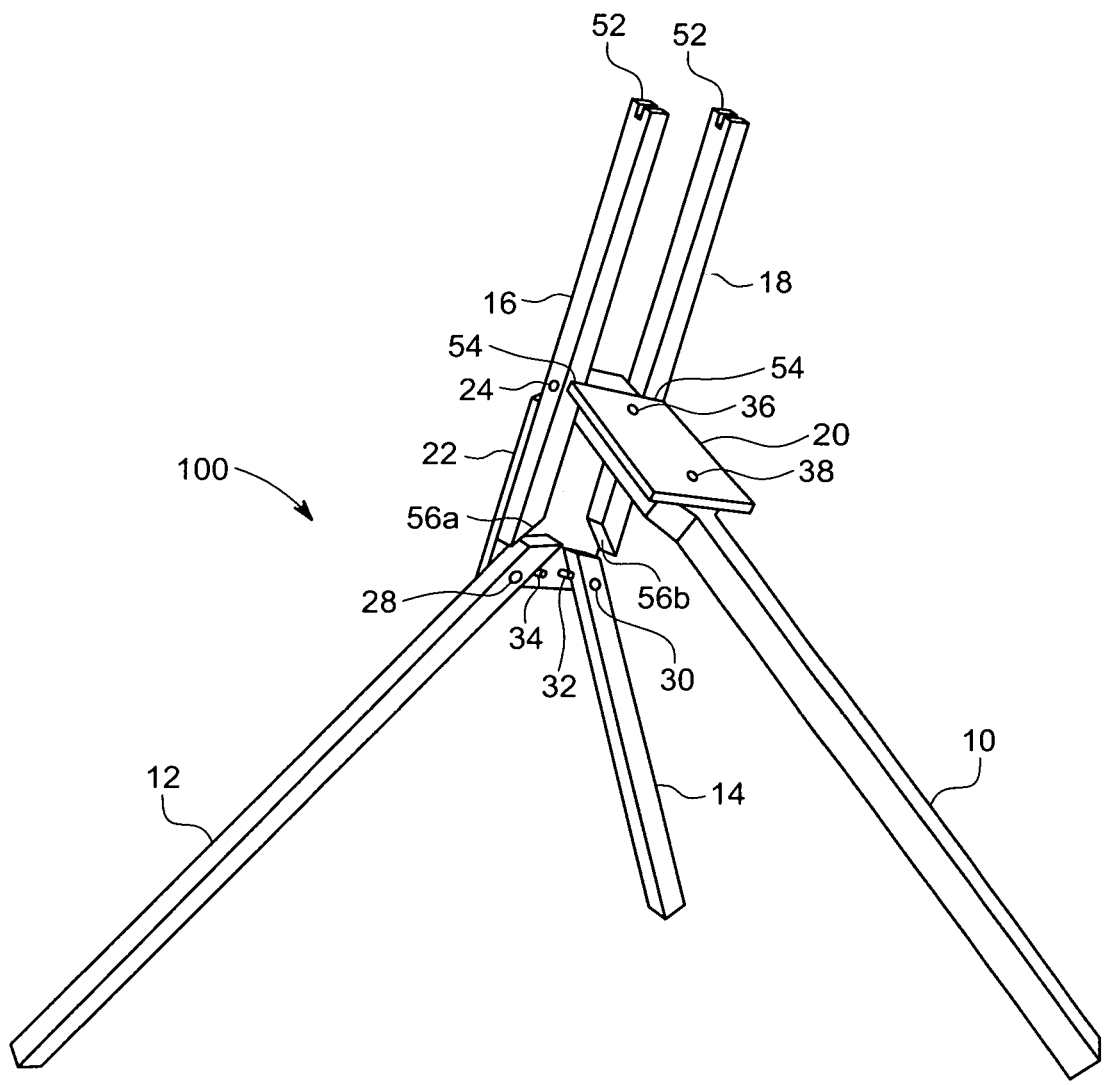
FIG. 2 shows a perspective view of the tip-down fishing rod holder of FIG. 1 from the back side of the holder with the holder shown in its opened configuration.
Figure 3:
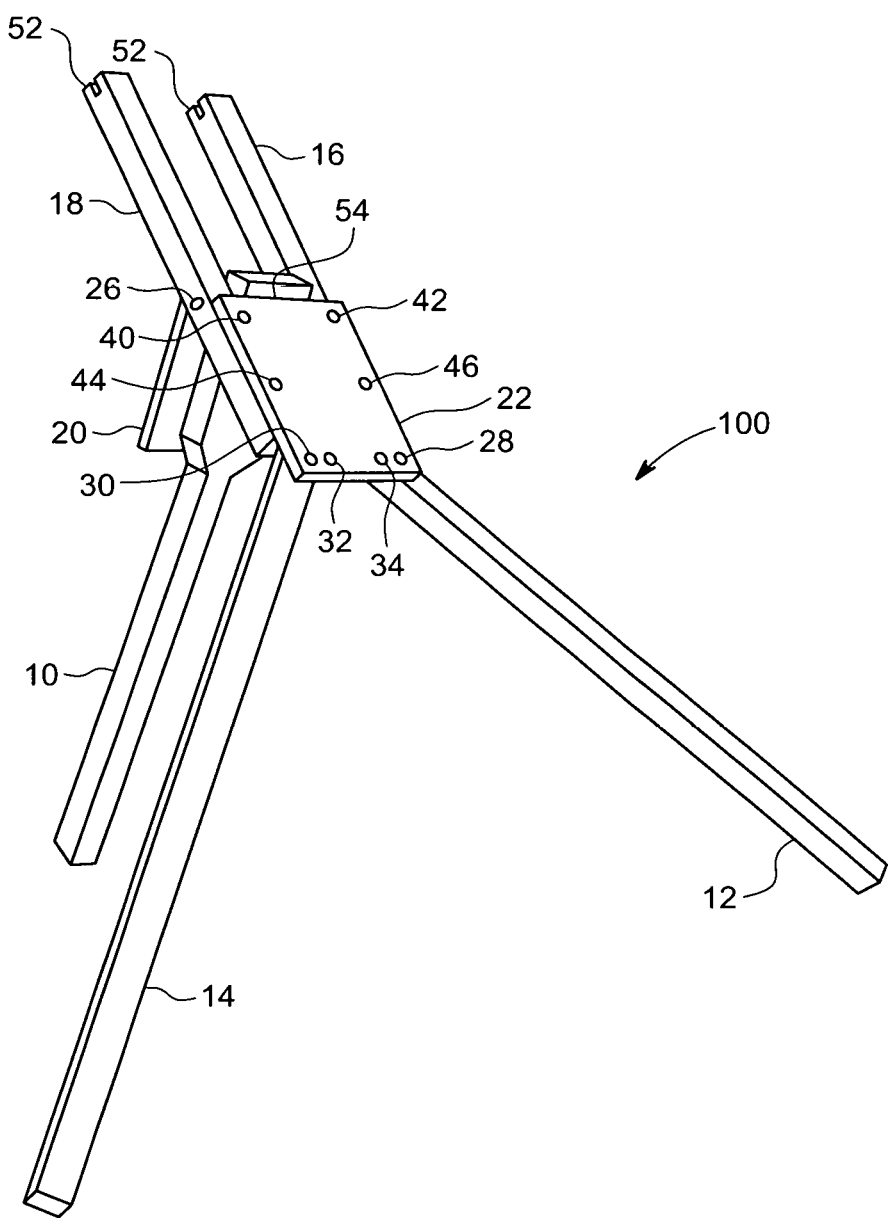
FIG. 3 shows a perspective view of the tip-down fishing rod holder of FIG. 1 from the front side of the holder, with the holder shown in its opened configuration.
Figure 4:
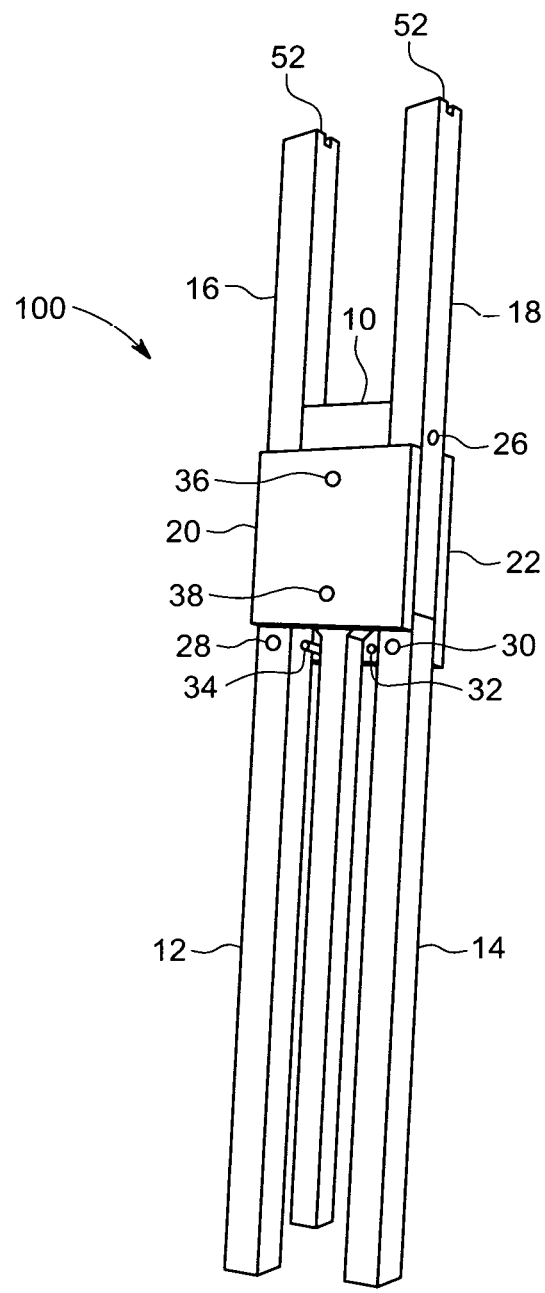
FIG. 4 shows a perspective view of the tip-down fishing rod holder of FIG. 1 from the back side of the holder, with the holder shown in its closed configuration.

As seen in FIG. 1, plate one 20 is fastened to leg one 10 using two fasteners 36, 38. Although, as discussed below, plate two 22 provides the primary travel limiter 54 for leg one 10, alternatively, or optionally, plate one 20 may provide an alternative rotational travel limiter (with the intersection of the upper edge of plate one 20 and arm one 16 and arm two 18 acting as the travel limiter). Plate one 20 contacts arm one 16 and arm two 18 in the collapsed position, as best seen in FIG. 4. If plate one 20 is providing the optional alternative rotational travel limiter then plate one 20 may also contact arm one 16 and arm two 18 in the open position, as best seen in FIGS. 2 and 3. Leg one 10 is connected to arm one 16 and arm two 18 via two pivot fasteners 24, 26. The pivot fasteners 24, 26 allow leg one 10 to rotate relative to arm one 16 and arm two 18. In the collapsed position leg one 10 contacts leg two 12 and leg three 14, preventing them from rotating outward or otherwise opening.

Plate two 22 is fastened to arm one 16 using two fasteners 42, 46 and plate two 22 is fastened to arm two 18 using two fasteners 40, 44. Plate two 22 also provides a rotational travel limiters 54 for leg one 10 in both directions (with the intersection of the upper edge of plate two 22 and leg one 10 acting as the travel limiter 54). The surfaces of the top ends of arm one 16 and arm two 18 each have a slot or channel 52 in them to provide a cradle for the pivot pin 48 of the rod holder strap 58. The bottom end of arm one 16 and arm two 18 are angled to provide a contact surface, and rotational travel limiter, for leg two 12 and leg three 14. The top of leg two 12 and leg three 14 have an angled configuration to provide a contact surface that corresponds to the angled contact surfaces of arm one 16 and arm two 18, respectively, in order to limit their travel when the fishing rod holder 100 is in its folded configuration. Leg two 12 is connected to plate two 22 with a pivot fastener 28, which allows leg two 12 to rotate relative to plate two 22 and arm one 16. Similarly, leg three 14 is connected to plate two 22 with a pivot fastener 30, which allows leg three 14 to rotate relative to plate two 22 and arm two 18. A travel limit pin 32 is fastened to and extends through plate two 22 to create a stop to limit the motion of leg three 14 when leg three 14 is extended to shift the fishing rod holder 100 into its tri-pod configuration. Likewise, a travel limit pin 34 is fastened to and extends through plate two 22 to create a stop to limit the motion of leg two 12 when leg two 12 is extended to shift the fishing rod holder 100 into its opened tri-pod configuration.

Figure 5:
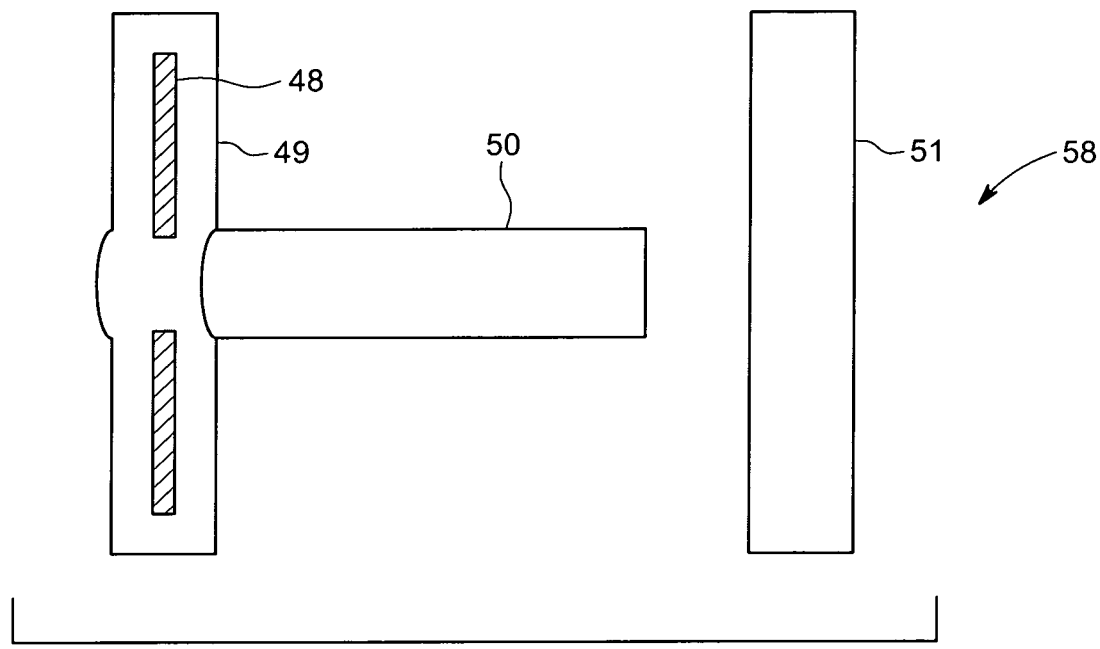
FIG. 5 shows a plan view of the fishing rod holder of the tip-down fishing rod holder of FIG. 1.
Figure 6:
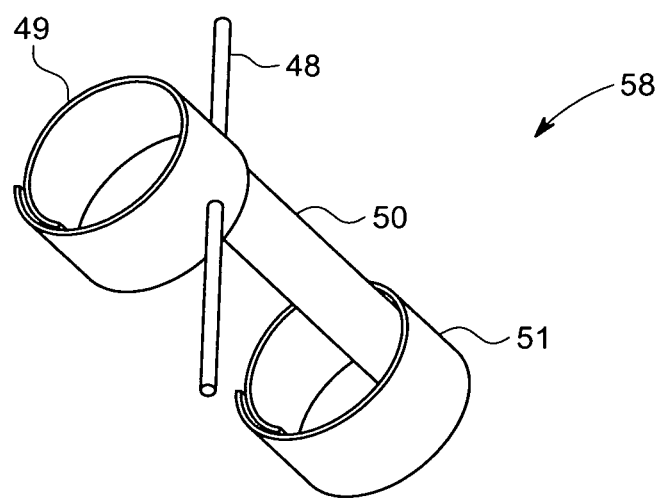
FIG. 6 shows a perspective view of the fishing rod holder of the tip-down fishing rod holder of FIG. 1.

As best seen in FIGS. 5 and 6, the rod holder strap 58 is constructed of up to three hook and loop straps 49, 50, 51 and a rigid pivot pin 48. Preferably, the straps 49, 50, 51 are configured to have hook structures on one side of the straps 49, 50, 51 and loop structures on the opposite side of the straps 49, 50, 51. A first strap 49 is cut just longer than the circumference of common fishing rod handles, or the circumference of the particular fishing rod handle that will be used with the fishing rod holder 100 of the present invention. Two holes or apertures are punctured through the first strap 49 and a rigid pin 48 is pushed through and located such that the rigid pin 48 extends from each such hole or aperture approximately the same distance. A second strap 50 is cut just longer than the length of a common spinning reel base, or the size of the specific spinning reel base for the particular spinning reel base that will be used with the fishing rod holder 100. This second strap 50 is placed substantially perpendicular to the first strap 49 with the rigid pin 48 (directly under the rigid pin 48 itself) and is fastened to the first strap 49 by some means commonly used in the art (for example, using an adhesive, glue, rivet, stitching, etc.) or, alternatively, the second strap 50 may be secured to the first strap 49 using the combination of the hook and loop structures of the two straps. A third strap 51 is also cut to a length just longer than the circumference of common fishing rod handles, or the circumference of the particular fishing rod handle that will be used with the rod holder. This third strap 51 is left separate for the placement to be at the user's discretion and is not secured directly to the second strap 50 to allow for optional use by the user, as well as to give the user the ability to vary the specific location of the third strap 51 such that it can be adjusted to fit various sizes for spinning reel bases. If the user chooses to use the third strap 51, it is secured to the second strap 50 using the corresponding hook and loop surfaces of the second strap 50 and third strap 51. Alternatively, if the user or the manufacturer of the rod holder desires that the third strap 51 be permanently secured to the second strap 50, it may be secured to the second strap 50 by some means commonly used in the art (for example, using an adhesive, glue, rivet, stitching, etc.).

FIG. 1 shows one embodiment of the tip-down fishing rod holder 100 of the present invention with an exemplar or representative fishing rod/reel (shown as a dashed line, which is not included in, nor does it directly pertain to, the fishing rod holder 100 of the present invention) set up as it would be in use by a user, with the fishing rod holder extended or opened into its tri-pod configuration. The first strap 49 (with pivot pin 48) would be placed around a rod/reel of choice and secured to itself using the hook and loop structure of the first strap 49. The first strap 49 would be located such that the pivot pin 48 would be perpendicular to the fishing rod. The first strap 49 would be pulled as tight as possible around the rod handle and fastened to itself. The second strap 50, which is perpendicular to the pivot pin 48

(and parallel to the fishing rod handle), extends backward along the top of the handle of the fishing rod toward the butt of the handle. The specific position of the first strap 49 and the specific location of the pivot pin 48 along the length of the fishing rod is determined at the user's discretion to provide the desired balance point or rod angle. However, typically the pivot pin 48 will be located just in front of the reel, regardless of the type of rod/reel being used. Next, the third strap 51 may be placed around the butt end of the rod and around the loose end of the previously installed second strap 50 (with corresponding hook and loop surfaces mating together). The typical location of the third strap 51 would be just behind the base of the spinning reel (at the butt end) to provide more stability to the position of the pivot pin 48.

In order to use the tip down fishing rod holder 100 of the present invention, the user opens the fishing rod holder 100 from its closed or collapsed configuration. Firstly, the user opens leg one 10 to its fullest extent. Leg one 10 will rotate about pivot fastener one 24 and pivot fastener two 26 relative to arm one 16 and arm two 18 until the travel limiter 54 is reached. The travel limiter 54 is the contact point of plate two 22 and leg one 10. If the optional alternative travel limiter is being utilized, there is also a contact point between plate one 20 and arm one 16 and arm two 18. Secondly leg two 12 would be extended outward to its travel limit. Leg two 12 will rotate relative to plate two 22 about pivot fastener 28 until the travel limit pin 34 is reached. Thirdly, leg three 14 would be extended outward to its travel limit. Leg three 14 will rotate relative to plate two 22 about pivot fastener 30 until the travel limit pin 32 is reached. After this, the user has extended the fishing rod holder 100 into its opened tri-pod configuration and it is ready for use during ice fishing or fishing in general.

The fishing rod holder 100 is placed on the ice with plate two 22 facing the hole in the ice or toward the water in which the user will be fishing. No tools or tightening of fasteners are needed. A baited line would be lowered down the hole in the ice or throw out into the water. The rod/reel would be placed onto this stand by means of locating the pin 48 in the channels 52 at the top of arm one 16 and arm two 18. The angle of the stand and arms 16, 18 allows for the use of spinning reels as well as other types of rod/reel combinations. Upon a fish biting the bait or lure in the water, the rod is free to tip down indicating a bite and allowing free travel for the fish. The open channels 52 on the top of arm one 16 and arm two 18 allow for the user to lift the rod/reel straight up to "set" the hook without delay or restriction.

Leg one 10, leg two 12, and leg three 14 provide a stable tripod that resists tipping over in the wind or in the event of a fish biting, and there is no need to pack snow, soil, or other material on/around to stabilize the fishing rod holder 100 as is often necessary with prior art fishing rod holders. The ends of the leg one 10, leg two 12, and leg three 14 make minimal contact with ice, which also helps prevent the fishing rod holder 100 from freezing into the ice during the course of a day of ice fishing. The backward raked angle of arm one 16 and arm two 18 when the fishing rod holder 100 is in its tri-pod configuration allow clearance for a spinning type reel to hang below the pivot pin 48 and channels 52, the pivot point tor the fishing rod, without the need to have arms 16, 18, wide enough for a spinning-type reel to fit between the arms themselves.

When not in use, the first strap 49 (as well as the second strap 50 and third strap 51, if used) and pivot pin 48 may be left on a rod/reel, if desired, and the fishing rod is removed from the fishing rod holder 100. The fishing rod holder 100 may then be collapsed for transport/storage by lifting the fishing rod holder 100 from the ice and closing leg two 12 and leg three 14 first and then leg one 10, such that leg two 12 rotates relative to plate two 22 about pivot fastener 28 and leg three 14 rotates relative to plate two 22 about pivot fastener 30 until leg two 12 and leg three 14 are approximately parallel. Then leg one 10 rotates relative to arm one 16 and arm two 18 about pivot fastener one 24 and pivot fastener two 26 until leg one 10 is also approximately parallel to leg two 12 and leg three 14. The fit between leg two 12 and leg three 14 and arm one 16 and arm two 18, respectively, provides a travel limit 56a, 56b, respectively. When leg one 10 is folded in, it also limits the rotation of leg two 12 and leg three 14 in the opposite outward direction, such that leg two 12 and leg three 14 do not rotate outward when the fishing rod holder 100 is in its closed and folded configuration.

It will be recognized by one skilled in the art that the size, configuration, or dimensions of the tip-down fishing rod holder of the present invention may be adjusted to allow for various sizes of fishing rods, reels, and desired rod holder sizes, as may be desired by the end user of the fishing rod holder. Likewise, it will be recognized by one skilled in the art that the materials from which the fishing rod holder of the present invention is made may be varied without departing from the scope of the present invention.

While the invention has been described in the specification and illustrated in the drawings with reference to certain preferred embodiments, it will be understood by those skilled in the art that various changes may be made and equivalents may be substituted for elements thereof without departing from the scope of the present invention. In addition, many modifications may be made to adapt to a particular situation or material to the teachings of the invention without departing from the essential scope thereof. Therefore, it is intended that the present invention not be limited to the particular embodiments illustrated by the drawings and described in the specification as the best modes presently contemplated for carrying out the present invention, but that the present invention will include any embodiments falling within the description of this specification.

What is claimed is:

1. A fishing rod holder comprising:
    a first leg;
    a second leg, wherein the top end of the second leg has an angled configuration with a pre-determined angle;
    a third leg, wherein the top end of the second leg has an angled configuration with a pre-determined angle;
    a first arm, wherein the first arm defines a first slot and wherein the bottom end of the first arm opposite the first slot has an angled configuration with a pre-determined angle;
    a second arm, wherein the second arm is parallel to the first arm and the second arm defines a second slot and wherein the bottom end of the second arm opposite the second slot has an angled configuration with a pre-determined angle;
    a first plate, wherein the first plate is secured to the first leg and has a flattened configuration;
    a second plate, wherein the second plate is secured to the first arm and the second arm and has a flattened configuration, the second plate is secured to the second leg by a pivot fastener such that the second leg rotates relative to the second plate, and the second plate is secured to the third leg by a pivot fastener such that the third leg rotates relative to the second plate; and
    a rod holder strap assembly, wherein the rod holder strap assembly includes at least one strap for securing the rod holder strap assembly to a fishing rod and a pivot pin that extends outward from the at least one strap substantially perpendicular to the fishing rod;

wherein the first leg is secured to the first arm and the second arm by at least one pivot fastener such that the first leg rotates relative to the first arm and the second arm; wherein the pre-determined angle of the top end of the second leg corresponds with the pre-determined angle of the bottom end of the first arm and the pre-determined angle of the top end of the third leg corresponds with the pre-determined angle of the bottom end of the second arm; and the pivot pin of the rod holder strap assembly is received by the first slot of the first arm and the second slot of the second arm, such that the rod holder strap assembly and the fishing rod held thereby rotates relative to the first arm and the second arm.

2. The fishing rod holder of claim 1, wherein the first plate defines a travel limiter which stops the rotation of the first leg relative to the first arm and the second arm at a predetermined angle.

3. The fishing rod holder of claim 2, wherein the travel limiter is a top edge of the first plate.

4. The fishing rod holder of claim 1, wherein the second plate includes at least one travel limiter pin and wherein the at least one travel limiter pin stops the rotation of the second leg and the third leg relative to the first arm and the second arm at a predetermined angle.

5. The fishing rod holder of claim 4, wherein the at least one travel limiter pin comprises a first travel limiter pin and a second travel limiter pin and wherein the first travel limiter pin stops the rotation of the second leg relative to the first arm at a predetermined angle and the second travel limiter pin stops the rotation of the third leg relative to the second arm at a predetermined angle.

6. The fishing rod holder of claim 1, wherein the at least one strap of the rod holder strap assembly comprises a first strap, a second strap, and a third strap, the first strap and third strap are perpendicular to the second strap, the first strap defines two pivot pin apertures, and the pivot pin extends through the two pivot pin apertures of the first strap and extends outward from the first strap substantially perpendicular to the second strap.

7. The fishing rod holder of claim 6, wherein the first strap, second strap, and third strap of the rod holder strap assembly comprise hook-and-loop straps.

8. This fishing rod holder of claim 7, wherein one surface of the first strap, second strap, and third strap comprises hooks and the opposite surface of the first strap, second strap, and third strap comprises loops.

9. This fishing rod holder of claim 1, wherein the first leg, second leg, third leg, first arm, and second arm comprise wood.

10. This fishing rod holder of claim 1, wherein the first leg, second leg, third leg, first arm, and second arm comprise plastic.

11. This fishing rod holder of claim 1, wherein the first leg, second leg, third leg, first arm, and second arm comprise metal.

12. The fishing, rod holder of claim 1, wherein the first plate and the second plate comprise plastic.

13. The fishing rod holder of claim 1, wherein the first plate and the second plate comprise metal.

14. The fishing rod holder of claim 1, wherein the first plate and the second plate comprise wood.

15. The fishing rod holder of claim 1, wherein the first plate is secured to the first leg with at least one fastener.

16. The fishing rod holder of claim 2, wherein the second plate is secured to the first arm with at least one fastener and the second plate is secured to the second arm with at least one fastener.

* * * * *